United States Patent
Lesea (10) Patent No.: US 6,225,869 B1
(45) Date of Patent: May 1, 2001

(54) SIGNAL CONDUCTOR WITH ACTIVE BOOSTERS NOT IN SERIES

(75) Inventor: Austin H. Lesea, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/271,635

(22) Filed: Mar. 17, 1999

(51) Int. Cl.[7] ............................. H03B 27/00; G06F 1/04
(52) U.S. Cl. ............................................. 331/55; 713/500
(58) Field of Search .................................. 713/500, 501, 713/503; 331/55

(56) References Cited

U.S. PATENT DOCUMENTS

| | | | |
|---|---|---|---|
| 5,163,068 | 11/1992 | El-Amawy | 375/107 |
| 5,204,559 | 4/1993 | Deyhimy | 307/480 |
| 5,321,314 | 6/1994 | Slemmer | 307/263 |
| 5,517,532 | 5/1996 | Reymond | 375/354 |
| 5,550,875 | 8/1996 | Bennett | 375/356 |
| 5,640,112 * | 6/1997 | Goto et al. | 327/141 |

* cited by examiner

Primary Examiner—Robert Pascal
Assistant Examiner—Kimberly Glenn
(74) Attorney, Agent, or Firm—T. Lester Wallace; Edel M. Young (57) ABSTRACT

A clock signal is driven at one point onto a clock bus of an integrated circuit by a driver circuit. Oscillators are coupled along the length of the clock bus. The oscillators are all loosely coupled to one another through the clock bus such that all the oscillators oscillate together at the frequency of the clock signal. The oscillators add energy to the clock signal on the clock bus locally so that all the energy required to sustain the clock signal does not have to come from the point of origin. By reducing current flow down the clock bus across the series resistance of the clock bus, limits on propagation speed due to the series resistance of the clock bus are avoided. In one embodiment, less than 15 milliwatts is consumed to "propagate" a 1.36 gigahertz clock signal a distance of two centimeters down a clock bus of an integrated circuit at a propagation speed of approximately $2.1 \times 10^7$ meters per second.

35 Claims, 5 Drawing Sheets

FIG. 9

SIGNAL CONDUCTOR WITH ACTIVE BOOSTERS NOT IN SERIES

FIELD OF THE INVENTION

This invention relates generally to methods and circuit configurations for propagating a periodic signal across an integrated circuit using active boosters.

BACKGROUND INFORMATION

Figure 1:
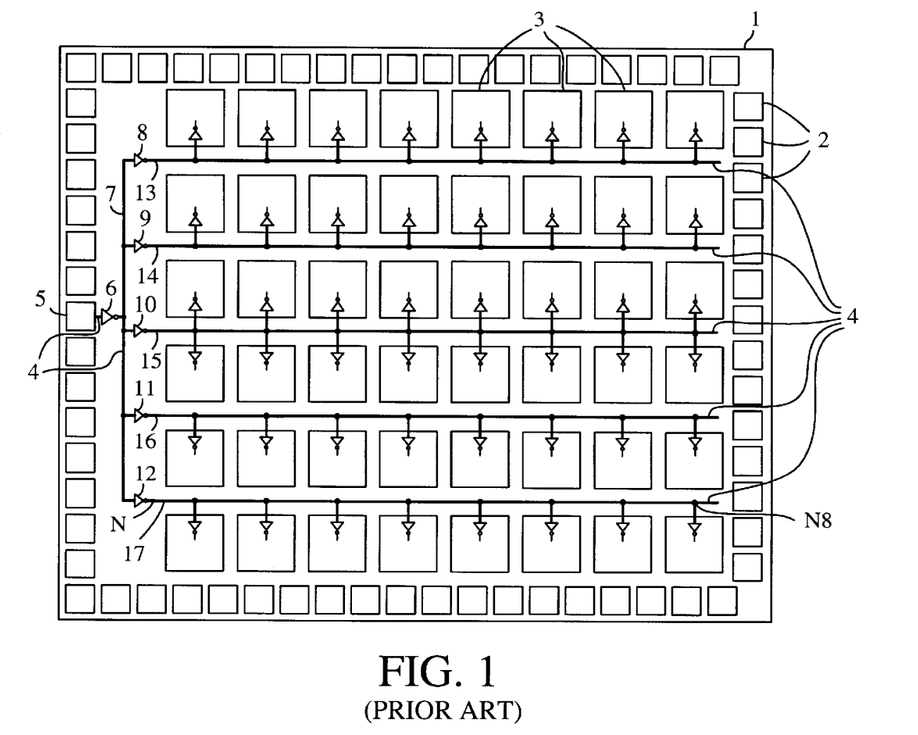
FIG. 1 (Prior Art) is a simplified top-down diagram showing the clock distribution network of a field programmable gate array (FPGA) integrated circuit.

FIG. 1 (Prior Art) is a simplified top-down diagram illustrative of a field programmable gate array (FPGA) integrated circuit 1. Integrated circuit 1 includes a ring of bond pads 2, an inner core of configurable logic blocks 3, and a fork-shaped clock distribution network 4. A clock signal present on a clock input bonding pad 5 passes through a clock buffer 6, is distributed vertically through a vertical clock bus 7, passes through clock buffers 8–12, and then propagates horizontally from left to right through corresponding horizontally extending clock buses 13–17. In the bottom most clock bus 17, the clock signal propagates left to right from node N at the output of clock buffer 12 and down the clock bus to node N8. The difference in time between the time when the clock signal arrives at node N and the time when the clock signal arrives at node N8 is called "clock skew". It is often desired to reduce this clock skew. One way to decrease clock skew is to increase clock signal propagation speed.

The theoretical maximum propagation speed v of a signal down a conductor in an integrated circuit is approximated in accordance with equation 1 below.

$$v = \frac{1}{\sqrt{K}} \cdot c \tag{equ. 1}$$

The constant c in equation 1 is the speed of light in free space ($3\times10^8$ meters per second). The constant K is the dielectric constant of the dielectric material separating the conductor from other conductors in the integrated circuit.

Figure 2:
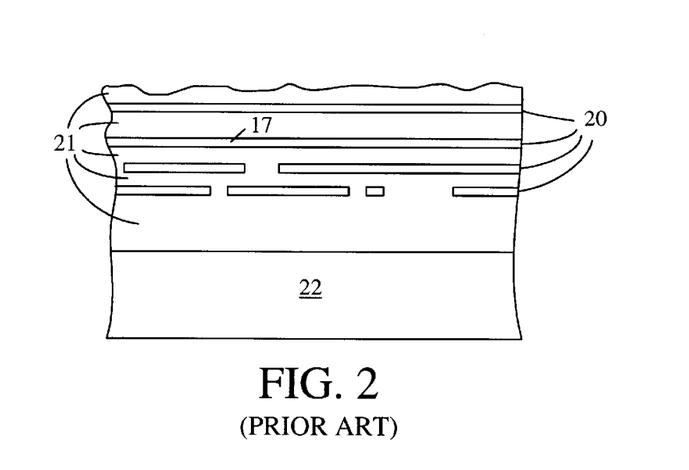
FIG. 2 (Prior Art) is a simplified cross-sectional diagram of a clock bus of the clock distribution network of the integrated circuit of FIG. 1.

FIG. 2 (Prior Art) is a simplified cross-sectional diagram of a portion of integrated circuit 1 showing a section of clock bus 17. Numerous layers of metalization 20 and dielectric material 21 are disposed over the substrate 22 of the integrated circuit 1. In the illustrated example, the metal of the clock bus 17 is insulated from other layers of metal above it and below it by dielectric material 21. In a conventional integrated circuit, dielectric material 21 is silicon dioxide. Silicon dioxide has a dielectric constant of approximately four. Substituting the number four for the constant K in equation 1 indicates that a clock signal should theoretically be able to propagate down a clock bus at about $1.5\times10^8$ meters per second (half the speed of light in free space).

Actual clock signals are, however, observed to travel at slower speeds. A real clock bus that extends across an integrated circuit has a significant distributed series resistance. This series resistance serves to limit the maximum propagation speed of the clock signal to a value below that of the theoretical $1.5\times10^8$ meters per second limit.

Figure 3:
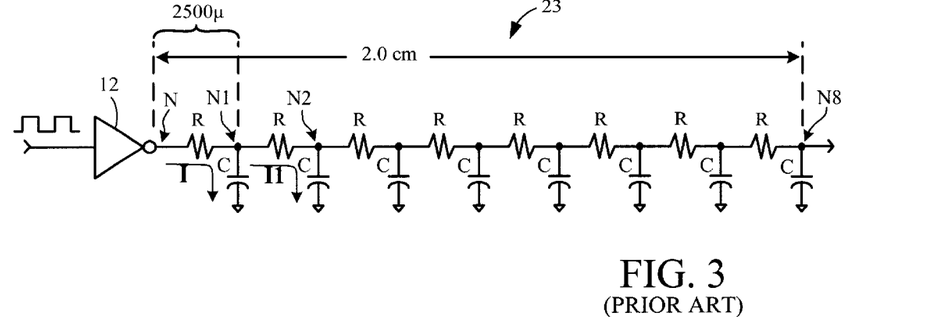
FIG. 3 is a circuit used for modeling the propagation of a signal through a clock bus of an integrated circuit.

FIG. 3 (Prior Art) illustrates a string of RC trees 23 that is often used to model the propagation of a clock signal down a buffered clock bus in an integrated circuit. Nodes N and N8 in FIG. 3 correspond to nodes N and N8, respectively, in FIG. 1. For the signal to propagate from node N to node N1, a current I must flow from node N through a series resistance R to charge the capacitor on node N1. The rate of increase of the voltage signal at node N1 is therefore limited by the series resistance R between nodes N and N1. When the voltage on node N1 increases, a current I1 can flow through the next series resistance R to charge the next capacitor on node N2. Such charging currents ripple down the string of RC trees of the structure of FIG. 3. It is therefore seen that the propagation speed of the signal is limited by resistance R and capacitance C. Because currents have to flow over these series resistances R to charge the capacitors C, larger values of R and C decrease the propagation speed of the signal. These series resistances R have the effect of limiting signal propagation speed to a value below the theoretical maximum as well as attenuating the signal. Consistent with the model of FIG. 3, clock signal propagation speed in an exemplary type of conventional field programmable gate array (FPGA) is about $2\times10^6$ meters per second.

For very high frequency clock signals, preserving the signal requires periodic buffering, and is illustrated in FIG. 3 by the pairs of inverters following each illustrated resistor R. In an effort to increase clock signal propagation speeds, conventional clock buses are often realized as wide traces of metal in order to decrease series resistance. Although increasing trace width serves to decrease series resistance, it also serves to increase distributed capacitance which again limits clock signal propagation speed. A solution to this quandary is desired.

Not only do increased resistance and capacitance limit propagation speed, but they also increase power consumption. The power P consumed by the clock bus modeled in FIG. 3 may be approximated in accordance with equation 2 below.

$$P = CV^2 f \tag{equ.2}$$

The constant C in equation 2 is the total capacitance of the bus. The constant V in equation 2 is the voltage amplitude of the signal. The constant f in equation 2 is the frequency of the clock signal. In one example of a conventional integrated circuit, the metal trace of the clock bus is made about 1.5 microns wide in order to decrease series resistance. Buffering is required between each node, as shown in FIG. 3, in order to assure proper operation. Each 2500 micron long section of this clock bus between nodes has a 35 ohm series resistance R. The distributed capacitance C at each node is about 0.675 picofarads. Buffering adds power dissipation as well. In accordance with equation 2, approximately 15 milliwatts are required to propagate a 1.65 volt clock signal along the metal portion of the clock bus. Approximately 51 milliwatts are dissipated by the buffers. Thus propagating a signal down such a clock bus at one gigahertz requires approximately 66 milliwatts. This is an undesirably large amount of power.

Circuits and methods for increasing clock signal propagation speeds and/or for reducing the associated power consumption are sought.

SUMMARY

The effect of the series resistance of a signal conductor of an integrated circuit is decreased by decreasing the magnitude of current that flows across the series resistance. Active boosters are distributed along the length of the signal conductor. The active boosters add energy to a periodic signal on the signal conductor locally so that the energy required to sustain the periodic signal does not all have to come from one point on the signal conductor. The provision of such active boosters decreases the magnitude of current that flows across the series resistance and therefore increases the propagation speed of the periodic signal down the conductor.

In one embodiment, the active boosters are oscillators, the periodic signal is a clock signal, and the signal conductor is a clock bus. A clock driver drives a clock signal S onto one end of the clock bus. The oscillators are all loosely coupled to one another through the clock bus such that all the oscillators oscillate together at the frequency of the clock signal. Each oscillator is coupled to the clock bus at a respective corresponding node. A 1.36 gigahertz signal S8 on the last node N8 is delayed in phase by a time T with respect to the periodic signal S driven onto the first node N by the clock driver. The first and last nodes are spaced by a distance D. In one embodiment, D/T is approximately 2.1× $10^7$ meters per second. The clock drivers and oscillators together consume less than about 15 milliwatts. In some embodiments, control circuitry is provided to keep the oscillators synchronized and oscillating at the clock frequency.

Other structures and methods are disclosed in the detailed description below. This summary does not purport to define the invention. The invention is defined by the claims.

DETAILED DESCRIPTION

Figure 4:
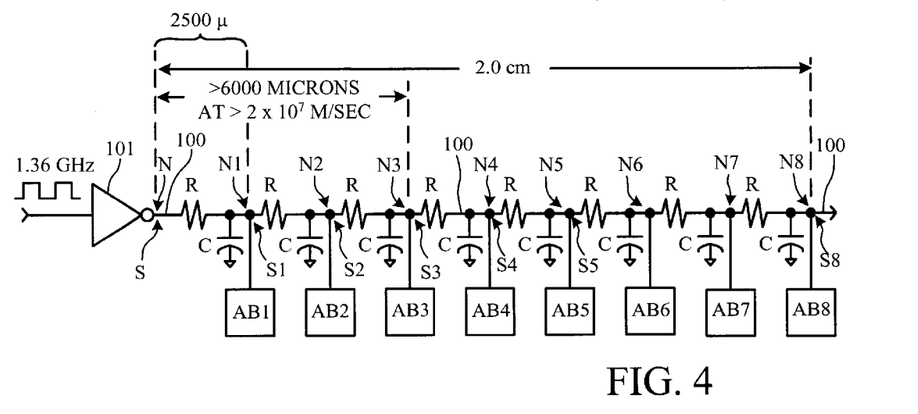
FIG. 4 is a simplified diagram of a signal conductor and a plurality of active boosters in accordance with an embodiment of the present invention.

FIG. 4 is a simplified circuit diagram of a signal conductor 100 and active boosters AB1–AB8 in accordance with one embodiment of the present invention. Signal conductor 100 extends left to right from a node N at the output of a signal driver 101 to a node N8 at the right of the diagram. Signal conductor 100 is illustrated as a string of RC trees. Each of the active boosters AB1–AB8 is coupled to a respective one of nodes N1–N8 of the signal conductor. Each active booster adds regenerative energy to a periodic signal on the signal conductor locally at a node corresponding to the active booster so that the energy required to sustain the periodic signal on that node does not have to flow through the signal conductor itself. In the embodiment of FIG. 4, the active boosters are "not in series" with signal conductor 100 in the sense that each of the active boosters has one and only one connection to signal conductor 100. An active booster does not receive an input signal from one location on signal conductor 100 and then drive a signal onto signal conductor 100 at a second location.

In one embodiment, active boosters AB1–AB8 are ring oscillators that are all loosely coupled together through the signal conductor so that they all oscillate together at the same frequency. Signal driver 101 drives a periodic signal S of frequency F onto node N at one end of the signal conductor. The natural oscillating frequencies of the oscillators AB1–AB8 are close to frequency F. The oscillators therefore synchronize themselves to the periodic signal.

Figure 5:
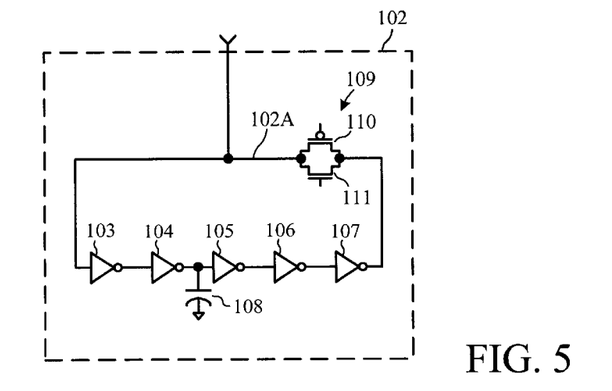
FIG. 5 is a simplified diagram of an active booster in accordance with one embodiment of FIG. 4.

FIG. 5 is a circuit diagram of one possible active booster oscillator 102. Oscillator 102 is a ring oscillator that includes five complementary metal oxide semiconductor (CMOS) inverters 103–107, an optional timing capacitor 108, and an optional passgate 109. Timing capacitor 108 is provided to adjust the natural oscillating frequency of the oscillator to the frequency F of the periodic signal S. Capacitor 108 is, in one embodiment, a metal two-plate capacitor. The active booster signal conductor circuit of FIG. 4 may be realized in a field programmable gate array (FPGA). In some applications, active boosters may not be needed or wanted (for example, when the desired frequency is below the controllable oscillating frequency range of the oscillators, when the clock signal is to be periodically stopped, or when it is desired to conserve power). Pass gate 109 is therefore provided so that the feedback loop of the ring oscillator can be broken at feedback node 102A to stop the oscillator from oscillating in those applications where the active boosters are not needed or wanted. In the embodiment of FIG. 4, the feedback loops of oscillators AB1–AB8 are all directly connected to signal conductor 100 so that the feedback loops of the oscillators AB1–AB8 are all loosely coupled together.

Numerous design parameters of the circuit of FIG. 4 are balanced so that oscillators AB1–AB8 all oscillate together synchronously with the periodic signal S driven onto the signal conductor 100 by signal driver 101. First, the natural oscillating frequencies of the oscillators AB1–AB8 are sufficiently close to the frequency of the periodic signal S that they can all oscillate together at the frequency of the periodic signal S.

Second, the "lock range" of the oscillators AB1–AB8 is sufficiently wide that the oscillating frequencies of the oscillators can shift over a relatively wide frequency range without one of the oscillators ceasing to oscillate in phase with periodic signal S. If an oscillator shows too great a resistance to changing its oscillating frequency to the oscillating frequency of the periodic signal S, it is possible that the oscillator may detract from rather than boost signal S, or even stop oscillating in phase with periodic signal S. Alternatively, if multiple oscillators show too great a resistance to adjusting their oscillating frequencies to the frequency of the periodic signal S, then those oscillators may break away and start to oscillate as a group independent of the periodic signal S. Avoidance of this problem is discussed below in connection with control circuit 114 of FIG. 7. A lock range (frequency band of possible operation divided by the center frequency of the band) of roughly twenty percent is acceptable in some embodiments.

Third, each oscillator does not drive its node on the signal conductor so strongly that it overwhelms signal S. If the downstream series resistance is lower than the upstream series resistance, an oscillator may be so tightly coupled to downstream oscillators that it fails to be influenced by the periodic signal it is receiving from upstream sources. Switching time of the first inverter 103 in oscillator 102 is controlled by the combination of an output voltage from inverter 107 and the voltage applied to oscillator 102 by signal S. If the phase of signal S is ahead of the output signal from inverter 107, inverter 103 will tend to switch sooner than it would if driven only by inverter 107. Thus the frequency of oscillator 102 is increased until the phases match, at which time oscillator 102 is in phase with signal S. Simulations and actual implementation in a programmable chip have demonstrated that oscillator 102 remains synchronized with signal S when the signal strength contributed by oscillator 102 is as much as four times as large as the strength of signal S applied by conductor 100. The feedback loop of each oscillator is, therefore, adequately coupled to the signal conductor, so that the periodic signal on the signal conductor affects the oscillating frequency of the oscillator.

In one specific embodiment, the eight active boosters AB1–AB8 of FIG. 4 are ring oscillators as illustrated in FIG. 5. Signal conductor 100 is a trace of copper 0.6 microns wide and 0.47 microns thick. Each successive node is spaced from its upstream neighbor by 2500 microns. In contrast to the prior art structure of FIG. 3 where efforts are made to minimize the series resistance between successive nodes, a larger series resistance between successive nodes in the structure of FIG. 4 may actually improve circuit performance in accordance with the present invention. This is because the larger series resistance of conductor 100 causes looser coupling of adjacent nodes so that farther adjacent nodes have minimal effect, and it is unlikely that an alternative oscillating frequency can exist. In the embodiment of FIG. 4 described above, the series resistance R between successive nodes is 180 ohms.

The distributed capacitance C on each node is 0.675 picofarads. Due to the relatively large series resistance, however, the effective capacitance seen by each oscillator is somewhat less than 0.675 picofarads. In contrast to typical conventional clock signal conductors that are separated from other conductors above and below by one micron or more to reduce distributed capacitance, signal conductor 100 in this embodiment is separated from other conductors above and below it by only 0.6 microns. The P channel and N channel transistors in the first four inverters 103–106 of the ring oscillators are six microns and nine microns in length, respectively. The P channel and N channel transistors in the last inverter 107 of the ring oscillator are 18 and 25 microns in length, respectively. Signal driver 101 is a CMOS inverter including a P channel transistor of 18 micron gate length and an N channel transistor of 25 micron gate length. Pass gate 109 includes a 25 micron P channel transistor 110 and an 18 micron N channel transistor 111. A 1.8 volt process is used to fabricate the circuitry of FIG. 4 and the circuit is operated from a 1.65 volt VCC supply voltage at 85 degrees Celsius. Signal driver 101 drives a 1.36 gigahertz periodic signal onto node N of signal conductor 100. The oscillators AB1–AB8 remained locked in synchronization with the periodic signal S over a frequency range of 1.2 gigahertz to 1.4 gigahertz.

Figure 6:
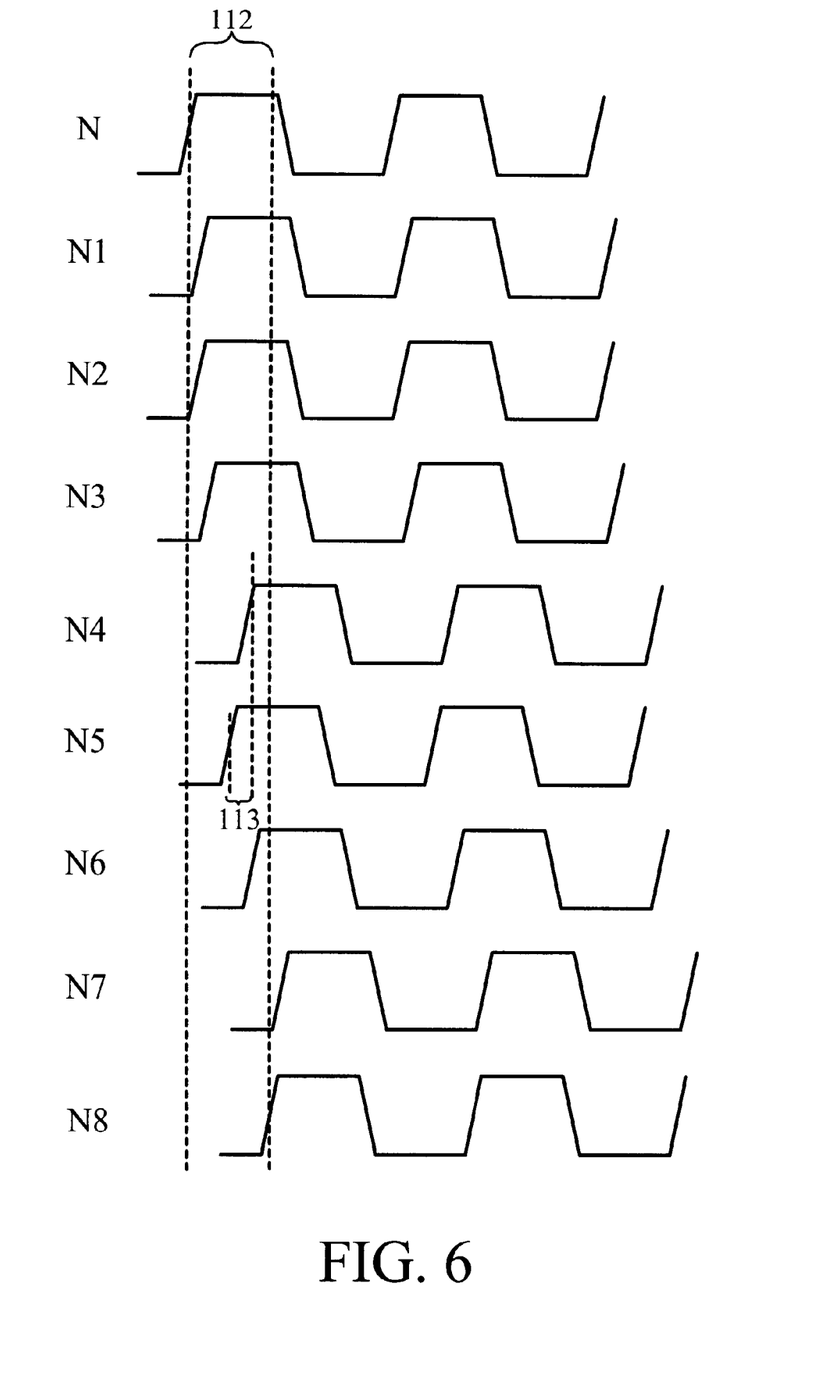
FIG. 6 is a simplified waveform diagram representative of the operation of the circuit of FIG. 4.

FIG. 6 is a simplified waveform diagram representative of an operation of the circuit of FIG. 4. Circuit simulation using the spice tool Star-HSPICE available from Avant! Corporation indicates that the phase of the signal on node N8 trails the phase of the signal on node N by a phase difference 112 of 0.7 nanoseconds for a periodic signal S of 1.36 gigahertz. Node N8 is spaced from node N by a distance of 20,000 microns (2.0 centimeters). The 1.36 gigahertz periodic signal S on node N is therefore said to "propagate" from node N to node N8 at a propagation velocity in excess of $2 \times 10^7$ meters per second (in the specific embodiment simulated, the propagation velocity is $2.143 \times 10^7$ meters per second).

As indicated by FIG. 6, the phase of the signal S5 on node N5 was actually leading the phase of the signal S4 on node N4 by a phase difference 113 of approximately ten picoseconds. An oscillator that has a natural oscillating frequency that is slightly higher than the frequency of the signal on the signal conductor will tend to advance the phase of the signal on its node by a small amount. Conversely, an oscillator that has a natural oscillating frequency that is slightly lower than the frequency of the signal on the signal conductor will tend to retard the phase of the signal on its node of the signal conductor.

In contrast to the relatively large amount of power (about 66 milliwatts) that the conventional structure of FIG. 3 consumes to propagate a one gigahertz signal two centimeters across an integrated circuit, the circuit of FIG. 4 (driver 101, signal conductor 100 and eight active boosters AB1–AB8) can propagate a one gigahertz signal two centimeters across an integrated circuit while consuming less than 15 milliwatts. The specific embodiment of FIG. 4 detailed above was simulated by Star-HSPICE to consume about 13.2 milliwatts (an average current of about 8 milliamperes at 1.65 volts VCC). This is a factor of four times less power than the prior art example described in the background section above.

Power consumption is reduced by making the transistors of the first four inverters 103–106 of minimum geometry for the process employed. Rather than driving the signal conductor 100 over the full digital logic voltage range, power consumption can be further reduced by reducing the voltage amplitude of the signal on the signal conductor. Power consumption can also be reduced by spacing the nodes at a distance of approximately half the wavelength of the periodic signal S. The series resistance, inductance and capacitance of the signal conductor should be chosen to form a weakly resonant circuit at the frequency of the periodic signal.

Figure 7:
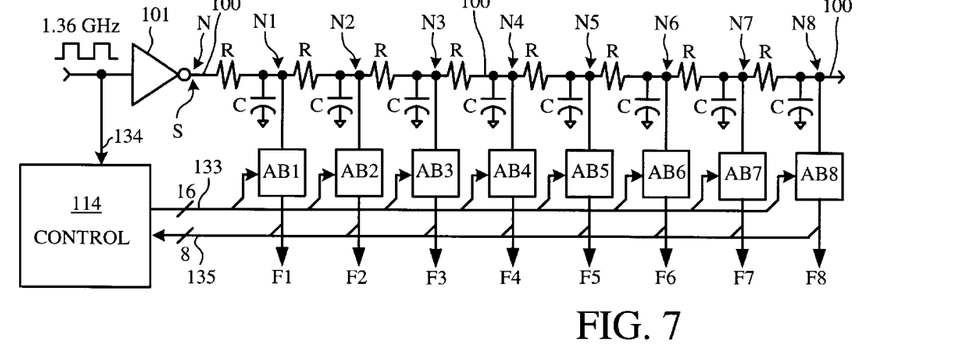
FIG. 7 is a diagram of an embodiment of the present invention that has control circuitry for controlling the active boosters.

FIG. 7 is a simplified circuit diagram in accordance with another embodiment of the present invention. In one embodiment, active boosters AB1–AB8 are oscillators. Each oscillator adds regenerative energy to the periodic signal on the signal conductor 100 and also supplies its oscillating signal in buffered form on an oscillator output lead for use by local digital logic circuitry. This digital logic circuitry may be digital logic circuitry of a logic block of an FPGA, the signal conductor 100 extending through a row of logic blocks such that there is one oscillator in each logic block of the row. In FIG. 7, the reference numerals F1–F8 on the output leads of oscillators AB1–AB8 represent the oscillating signals of frequencies F1–F8 that are output by the oscillators. When the circuit of FIG. 7 is operating properly, all the oscillators are synchronized and the frequencies F1–F8 are identical.

Control circuitry 114 controls the operation of the eight oscillators AB1–AB8 so that all the oscillators remain synchronized to the signal S output by driver 101. If, for example, one of the oscillators were periodically to insert an extra clock edge, this may indicate that the oscillator has a natural oscillating frequency higher than the frequency of the signal on the signal conductor. In such a situation, control circuitry 114 controls the oscillator to decrease its natural operating frequency. Alternatively, if one of the oscillators were to periodically skip a clock pulse, this may indicate that the oscillator has a natural oscillating frequency lower than the frequency of the signal on the signal conductor. In such a situation, control circuitry 114 controls the oscillator to increase its natural oscillating frequency.

Figure 8:
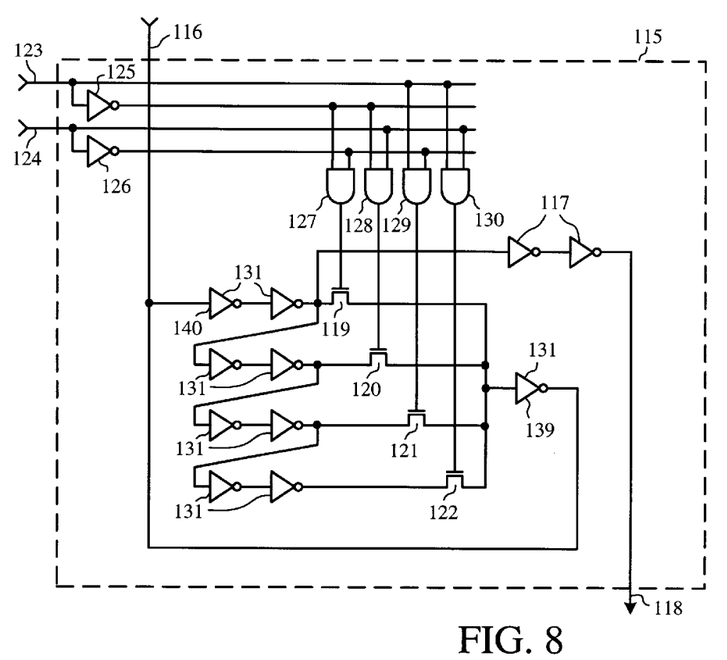
FIG. 8 is a simplified circuit diagram of an active booster in accordance with one embodiment FIG. 7.

In one embodiment, the active boosters AB1–AB8 are ring oscillators as shown in FIG. 8. Each oscillator 115 is coupled to a respective node of signal conductor 100 by its lead 116. The signal oscillating in the oscillator is supplied to the control circuitry 114 via buffers 117 and oscillator output lead 118. Depending on which one of N channel transistors 119–122 is conductive, the oscillator 115 has three, five, seven or nine inverters 131 in its feedback loop. Which one of the N channel transistors 119–122 is conductive is determined by a two-bit digital value on two select input leads 123 and 124 of the oscillator. Inverters 125 and 126, AND gates 127–130 and N channel transistors 119–122 together comprise a 4-to-1 multiplexer having two select input leads 123 and 124. The control circuitry 114 controls how many inverters are in the feedback loop of the oscillator via the input leads 123 and 124 and therefore can change the natural oscillating frequency of the oscillator. Some embodiments of a ring oscillator similar to FIG. 8 include a disable input lead for breaking the feedback loop of the oscillator. A passgate such as 109 shown in FIG. 5 can be provided. In situations where clock signal S may stop switching, such a passgate must be provided in order to avoid having the oscillators generate an erroneous clock signal. Turning off such a passgate also allows the system to save power.

Figure 9:
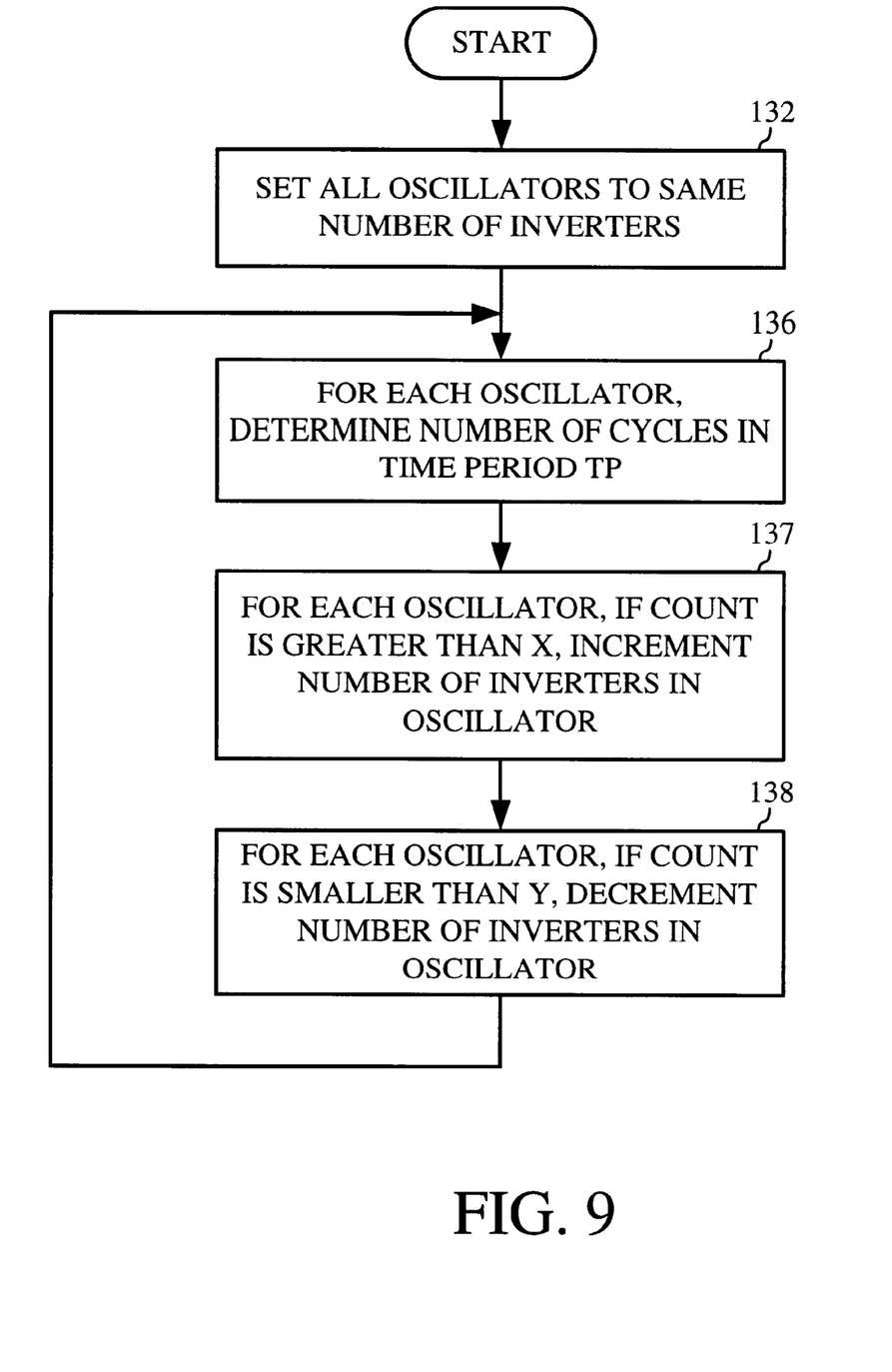
FIG. 9 is a flow chart of a method of controlling the active boosters of FIG. 7 in accordance with one embodiment of the present invention.

FIG. 9 is a flowchart of a method carried out by the control circuitry 114 in accordance with one embodiment of the present invention. First, in step 132, the control circuitry controls all oscillators to have the same number of inverters in their feedback loops by outputting the same digital value (for example, two) to each of the oscillators on control lines 133. The signal on the input lead of driver 101 (FIG. 7) is received on input lead 134 and is divided down by a counter in control circuitry 114 to generate a timebase. There are also eight other counters in the control circuitry 114, one for each of the oscillators. The clock input lead of the counter corresponding to an oscillator is coupled to the oscillating signal output by the oscillator via a corresponding one of the frequency monitoring lines 135. In a first state of the timebase, the eight counters are held in their cleared states.

As indicated in step 136, at the beginning of a second state of the timebase, the counters are released from their cleared states. The counters then count the number of clock cycles on their respective clock input leads. When the timebase enters a third state of the timebase, each respective counter holds a count indicative of the number of clock cycles that were output by a corresponding oscillator during the second state (during time period TP) of the timebase. The number of cycles of each oscillator in time period TP is therefore determined in accordance with step 136.

As indicated in step 137, timer period TP can be made to correspond to a large number of clock cycles so that the frequencies of the oscillators can be monitored with considerable accuracy despite the fact that the propagation delay from the oscillators to the control circuitry might vary from oscillator to oscillator. In one embodiment, a time period TP of about one millisecond is used with a 1.36 gigahertz periodic signal S.

There is a given number of cycles that should be counted by each counter in time period TP. If the number of cycles counted by a counter is greater than a number X (which is preferably equal to the number counted on input lead 134), then control circuitry 114 increments the digital value supplied to the corresponding oscillator so that the natural oscillating frequency of the oscillator will be decreased (step 137).

Alternatively, as indicated in step 138, if the number of cycles counted by the counter is smaller than a number Y (which is also preferably equal to the number counted on input lead 134), then control circuitry 114 increments the digital value supplied to the corresponding oscillator so that the natural oscillating frequency of the oscillator will be increased (step 138). After the adjustment of the number of inverters in steps 137 and 138, the counters are cleared and control returns to step 136. In some embodiments, the numbers X and Y are different (for example, when a clock signal is to be divided or multiplied) and in some embodiments they are equal.

Although the present invention is described in connection with certain specific embodiments for instructional purposes, the present invention is not limited thereto. Any one of a number of methods for controlling the plurality of coupled oscillators via the sixteen digital control lines 133 of FIG. 7 can be employed. The method of FIG. 9 is merely one exemplary method. There are also numerous ways in which the natural operating frequencies of an oscillator can be changed. Changing the number of inverters in the feedback loop of a ring oscillator is but one technique. Another technique is to adjust the supply voltage provided to the oscillator inverters. In one embodiment, the supply voltage provided to last inverter 139 of the oscillator 115 is controlled so that the degree to which the oscillator drives its node on the signal conductor can be controlled. This supply voltage also affects the speed that output inverter 139 can switch the logic level on the input of inverter 140 and therefore can also be used to control the natural operating frequency of the oscillator. Signal conductors can have numbers of active boosters other than eight. Coupling a single active booster to a signal conductor can, for example, increase the propagation speed of a periodic signal across an integrated circuit. Periodic signal S need not be a digital signal but rather may be an analog signal, for example, a sinusoidal signal. Of course, using oscillators as boosters will cause the boosted signal to become more square and not remain sinusoidal. In one embodiment, the oscillators are operating optimally when the peak supply current drawn by each of the oscillators is at a minimum. The control circuitry in this embodiment therefore monitors the supply current drawn by each of the oscillators and controls the oscillators via control lines 133 so as to minimize the peak supply current drawn by each of the oscillators. The use of negative resistance devices (for example, unijunction transistors and Gunn diodes) and the use of active devices which create a negative resistance (for example, gyrators) are also suggested for realizing active boosters in accordance with some embodiments.

Accordingly, various modifications, adaptations, and combinations of various features of the described embodiments can be practiced without departing from the scope of the invention as set forth in the claims.

What is claimed is:

1. An integrated circuit, comprising:
   a circuit driving a periodic signal S of frequency F onto a node N;
   a conductor extending from node N to a node N1, from node N1 to a node N2, and from node N2 to a node N3;
   an active booster AB1 coupled to node N1, a periodic signal S1 of frequency F being present on node N1, active booster AB1 adding energy to periodic signal S1;
   an active booster AB2 coupled to node N2, a periodic signal S2 of frequency F being present on node N2, active booster AB2 adding energy to periodic signal S2; and
   an active booster AB3 coupled to node N3, a periodic signal S3 of frequency F being present on node N3, active booster AB3 adding energy to periodic signal S3, wherein active booster AB1 is an oscillator, active booster AB2 is an oscillator, and active booster AB3 is an oscillator.

2. The integrated circuit of claim 1, wherein the periodic signal is a clock signal, wherein frequency F is at least one gigahertz, and wherein the conductor consists essentially of a metal conductor.

3. The integrated circuit of claim 1, wherein the integrated circuit is a field programmable gate array (FPGA) comprising a logic block.

4. The integrated circuit of claim 3, wherein the active booster AB1 outputs a buffered version of the signal of frequency F1 to the logic block, the logic block comprising digital logic circuitry, the buffered version of the signal clocking the digital logic circuitry of the logic block.

5. An integrated circuit, comprising:
a circuit driving a periodic signal S of frequency F onto a node N;
a conductor extending from node N to a node N1, from node N1 to a node N2, and from node N2 to a node N3;
an active booster AB1 coupled to node N1, a periodic signal S1 of frequency F being present on node N1, active booster AB1 adding energy to periodic signal S1;
an active booster AB2 coupled to node N2, a periodic signal S2 of frequency F being present on node N2, active booster AB2 adding energy to periodic signal S2; and
an active booster AB3 coupled to node N3, a periodic signal S3 of frequency F being present on node N3, active booster AB3 adding energy to periodic signal S3, wherein periodic signal S3 is phase shifted by a time T with respect to periodic signal S, and wherein node N is spaced from node N3 by a distance D of at least 6000 microns, wherein D/T is greater than $2 \times 10^7$ meters per second.

6. An integrated circuit, comprising:
a circuit driving a periodic signal S of frequency F onto a node N;
a conductor extending from node N to a node N1, from node N1 to a node N2, and from node N2 to a node N3;
an active booster AB1 coupled to node N1, a periodic signal S1 of frequency F being present on node N1, active booster AB1 adding energy to periodic signal S1;
an active booster AB2 coupled to node N2, a periodic signal S2 of frequency F being present on node N2, active booster AB2 adding energy to periodic signal S2; and
an active booster AB3 coupled to node N3, a periodic signal S3 of frequency F being present on node N3, active booster AB3 adding energy to periodic signal S3, wherein frequency F is at least one gigahertz, and wherein the circuit driving the periodic signal, active booster AB1, active booster AB2 and active booster AB3 together consume a total of less than 15 milliwatts.

7. An integrated circuit, comprising:
a circuit driving a periodic signal of a frequency F onto a node N;
a conductor extending from node N to a node N1; and
a first oscillator coupled to node N1 and driving a signal of frequency F1 onto node N1, frequency F1 being equal to frequency F.

8. The integrated circuit of claim 7, further comprising:
a conductor extending from node N1 to a node N2; and
a second oscillator coupled to node N2 and driving a signal of frequency F2 onto node N2, frequency F2 being equal to frequency F.

9. The integrated circuit of claim 7, wherein the first oscillator has a feedback loop, the feedback loop of the first oscillator being coupled to node N1.

10. The integrated circuit of claim 7, wherein node N is separated from node N1 by a distance D, the periodic signal propagating from node N to node N1 in time T, D/T being greater than $2 \times 10^7$ meters per second.

11. The integrated circuit of claim 7, wherein node N is separated from node N1 by a distance D, the signal of frequency F2 being phase shifted by a time T with respect to the periodic signal, wherein D/T is greater than $2 \times 10^7$ meters per second.

12. The integrated circuit of claim 11, wherein distance D is greater than 2000 microns, wherein frequency F is at least one gigahertz, and wherein the driving circuit and the first oscillator consume less than 15 milliwatts.

13. The integrated circuit of claim 7, wherein the conductor is a metal conductor, the metal conductor being insulated from another conductor of the integrated circuit by an interlayer dielectric material, the interlayer dielectric material having dielectric constant of greater than two, the conductor extending a distance D greater than 2000 microns from node N to node N1.

14. The integrated circuit of claim 7, wherein frequency F1 is controlled so that frequency F1 is equal to frequency F.

15. The integrated circuit of claim 7, wherein frequency F is a fixed frequency, the circuit driving the periodic signal receiving no signal feedback from node N.

16. The integrated circuit of claim 7, wherein the first oscillator is a ring oscillator comprising a plurality of inverters.

17. The integrated circuit of claim 7, wherein the circuit driving the periodic signal receives no signal feedback from node N, wherein the circuit driving the periodic signal is a CMOS inverter, wherein the periodic signal is a clock signal, wherein frequency F is at least one gigahertz, and wherein node N is separated from node N1 by a distance greater than 2000 microns.

18. The integrated circuit of claim 7, further comprising:
control circuitry that controls the first oscillator such that the first oscillator oscillates at frequency F of the periodic signal.

19. The integrated circuit of claim 18, wherein the first oscillator has a natural oscillating frequency, the control circuitry controlling the natural oscillating frequency of the first oscillator.

20. An integrated circuit, comprising:
a signal path extending sequentially through a plurality of nodes N, N1, N2 and N3;
a circuit driving a periodic signal S of a frequency F onto node N;
a first oscillator driving a signal S1 of frequency F1 onto node N1, frequency F1 being equal to frequency F;
a second oscillator driving a signal S2 of frequency F2 onto node N2, frequency F2 being equal to frequency F; and
a third oscillator driving a signal S3 of frequency F3 onto node N3, frequency F3 being equal to frequency F.

21. The integrated circuit of claim 20, wherein the signal path is a single metal conductor that extends from node N to node N3.

22. The integrated circuit of claim 20, wherein the signal path comprises conductors each having a measurable resistance, and each attached to active circuitry.

23. The integrated circuit of claim 20, wherein the signal path has additional nodes between node N and node N3, the integrated circuit further comprising additional oscillators, each additional oscillator being coupled to a respective corresponding one of the additional nodes.

24. The integrated circuit of claim 20, node N being spaced from node N3 by a distance D of at least 6000 microns, the signal S3 of frequency F3 on node N3 being phase shifted by a time T from the periodic signal S of frequency F on node N, wherein D/T is greater than $2 \times 10^7$ meters per second.

25. The integrated circuit of claim 20, wherein node N is spaced from node N3 by a distance D of at least 6000 microns, wherein frequency F is at least one gigahertz, and wherein the circuit driving the periodic signal, the first oscillator, the second oscillator and the third oscillator together consume less than 15 milliwatts.

26. The integrated circuit of claim 20, further comprising:
control circuitry coupled to the first oscillator, coupled to the second oscillator and coupled to the third oscillator, the control circuitry outputting a first control signal to the first oscillator, outputting a second control signal to the second oscillator, and outputting a third control signal to the third oscillator.

27. The integrated circuit of claim 26, wherein the first, second and third control signals are digital signals.

28. The integrated circuit of claim 26, wherein the first control signal is a first supply voltage supplied to the first oscillator by the control circuitry, wherein the second control signal is a second supply voltage supplied to the second oscillator by the control circuitry, and wherein the third control signal is a third supply voltage supplied to the third oscillator by the control circuitry.

29. An integrated circuit, comprising:
a clock bus having a first node and a second node, the first node being separated from the second node by a distance D, D being at least 6000 microns, a first clock signal of frequency F being present on the first node;
means providing a second clock signal of frequency F on the second node such that the second clock signal is phase shifted by a time T from the first clock signal and so that D/T is greater than $2 \times 10^7$ meters per second, the means comprising a plurality of oscillator circuits that supply energy to the clock bus; and
digital logic circuitry that is clocked by a third clock signal, the third clock signal that clocks the digital logic circuitry being derived from the second clock signal.

30. The integrated circuit of claim 29, wherein the means further comprises control circuitry, the control circuitry outputting control signals to each of the oscillators.

31. A method comprising:
driving a first signal of frequency F onto a node N of a conductor, the conductor being a part of an integrated circuit; and
generating a second signal of frequency F on the integrated circuit and supplying the second signal onto a node N1 of the conductor, the second signal being phase shifted by a time T1 with respect to the first signal, node N being separated from node N1 by a distance D of at least 2000 microns, wherein D/T1 is greater than $2 \times 10^7$ meters per second.

32. The integrated circuit of claim 31, wherein the first signal is a clock signal, wherein frequency F is at least one gigahertz, wherein the first signal is driven onto node N by an inverter of the integrated circuit, and wherein the second signal is supplied onto node N1 by an oscillator of the integrated circuit.

33. The integrated circuit of claim 32, wherein the integrated circuit is a field programmable gate array (FPGA), the field programmable gate array comprising a logic block, the logic block comprising digital logic circuitry, the oscillator outputting a buffered version of the second signal, the buffered version of the second signal clocking the digital logic circuitry of the logic block.

34. A method comprising:
driving a first signal of frequency F onto a node N of a conductor, the conductor being a part of an integrated circuit;
generating a second signal of frequency F on the integrated circuit and supplying the second signal onto a node N1 of the conductor, the second signal being phase shifted by a time T1 with respect to the first signal, node N being separated from node N1 by a distance D of at least 2000 microns, wherein the conductor has a node N2; and
generating a third signal of frequency F on the integrated circuit and supplying the third signal onto node N2 of the conductor, the third signal being phase shifted by a time T2 with respect to the first signal, node N2 being separated from node N by a distance D of at least 4000 microns, D/T2 being greater than $2 \times 10^7$ meters per second.

35. A circuit, comprising:
a circuit driving a periodic clock signal S of frequency F onto a node N;
a conductor extending from node N to a node N1, from node N1 to a node N2, and from node N2 to a node N3;
an active booster AB1 coupled to node N1, a periodic signal S1 of frequency F being present on node N1, active booster AB1 adding energy to periodic signal S1;
an active booster AB2 coupled to node N2, a periodic signal S2 of frequency F being present on node N2, active booster AB2 adding energy to periodic signal S2; and
an active booster AB3 coupled to node N3, a periodic signal S3 of frequency F being present on node N3, active booster AB3 adding energy to periodic signal S3, wherein active booster AB1 is an oscillator, active booster AB2 is an oscillator, and active booster AB3 is an oscillator.

\* \* \* \* \*